United States Patent Office 2,838,515
Patented June 10, 1958

2,838,515

ORGANOSILICON SUBSTITUTED PYRIDINES

Leo H. Sommer, State College, Pa., assignor to Dow Corning Corporation, Midland, Mich., a corporation of Michigan No Drawing. Application October 28, 1953
Serial No. 388,920

4 Claims. (Cl. 260—290)

This invention relates to organosilicon derivatives of pyridine.

It is the object of this invention to prepare novel organosilanes and organosiloxanes which are useful as solvents and as lubricants.

This invention relates to organosilylpyridines of the formula

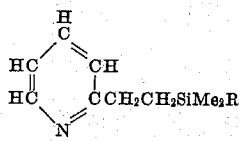

where R is methyl or phenyl.

The triorganosilyl substituted pyridines of this invention are best prepared by reacting 2-picolyl lithium with chloromethyltrimethylsilane or chloromethylphenyldimethylsilane. The picolyl lithium is best prepared by reacting 2-picoline with phenyl lithium in accordance with the procedure fully described in "Organic Syntheses," vol. 23, page 83 (1943).

This invention further relates to siloxanes of the formula

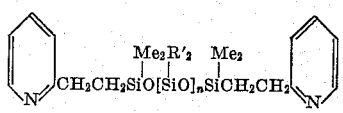

where R' is a monovalent hydrocarbon radical or a halogenated aryl hydrocarbon radical and $n$ has a value of at least zero.

The compound in which $n$ is zero (that is, the disiloxane) is prepared by reacting the above organosilyl pyridines with concentrated sulphuric acid which causes cleavage of the R group to give methane or benzene. The resulting product is thereafter treated with water and the resulting aqueous solution is made alkaline with an alkali metal hydroxide. The reactions involved may be represented by the following:

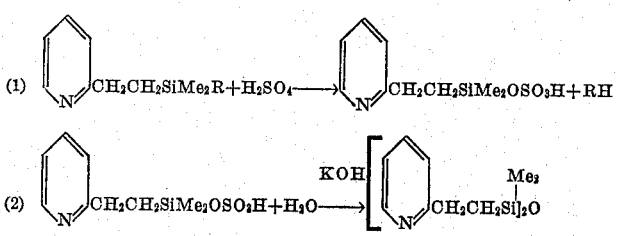

The disiloxane so formed can be copolymerized with diorganosiloxanes by means of siloxane bond rearrangement. The copolymerization is best carried out by employing an alkali metal hydroxide catalyst. The products thus obtained are linear polymeric siloxanes which are end blocked by triorganosilyl units containing the pyridine radical. In these compounds the value of $n$ can be regulated to any desired average value even upwards of 10,000, by controlling the relative proportion of the disiloxane to the diorganosiloxane. The smaller is the amount of disiloxane relative to the diorganosiloxane employed, the higher will be the value of $n$.

For the purpose of this invention any diorganosiloxane in which the organic radicals attached to the silicon are any monovalent hydrocarbon radical and/or any halogenated aryl hydrocarbon radical can be copolymerized with the pyridine substituted disiloxane of this invention. Specific examples of diorganosiloxanes which are operative herein are alkyl substituted siloxanes such as dimethylsiloxane, phenylmethylsiloxane, and stearylmethylsiloxane; alkylene substituted siloxanes such as vinylmethylsiloxane, divinylsiloxane, and allylphenylsiloxane; aryl hydrocarbon substituted siloxanes such as diphenylsiloxane, xenylmethylsiloxane and ditolylsiloxane; and halogenated aryl hydrocarbon substituted siloxanes such as bromoxenylmethylsiloxane, bis-trifluorotolylsiloxane and chlorophenylmethylsiloxane.

The siloxanes of this invention are useful as lubricants.

The following examples are illustrative only and should not be construed as limiting the invention which is properly set forth in the appended claims.

Example 1

74.5 g. of freshly distilled, anhydrous 2-picoline was added with stirring over a period of ½ hour to a solution of 2.14 mols of phenyl lithium in 500 ml. of anhydrous ether. The solution became blood red in color. Stirring was continued for one hour after which 73.5 g. of chloromethyltrimethylsilane was added dropwise. The temperature of the reaction mixture rose from 29 to 44° C. After addition was complete, the mixture was stirred overnight at room temperature.

Methanol and water were then added to destroy the excess lithium. The organic layer was separated, washed with water, and the aqueous residue was extracted with two 100 ml. portions of ether. The combined organic portions were dried over KOH pellets and distilled to give 2-(beta-trimethylsilylethyl)-pyridine

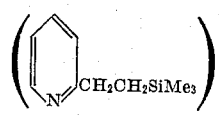

B. P. 117–118° C. at 30 mm., $n_D^{20}$ 1.4865, $MR_D$ 57.3 and percent by weight silicon 16.1.

Example 2

41.6 g. of 2-(beta-trimethylsilylethyl)-pyridine was added dropwise, with cooling in an ice bath and vigorous stirring, to 200 ml. of concentrated sulphuric acid. Methane was evolved and after 24 hours stirring at room temperature, the mixture was poured onto crushed ice. A homogeneous aqueous solution resulted which was made strongly acid with concentrated potassium hydroxide solution. A white solid appeared which was filtered by suction. The solid was extracted overnight in a Soxhlet extractor with acetone. The acetone solution was distilled to give 3,3,5,5-tetramethyl-3,5-disila-4-oxa- 1,7-di(2-pyridyl)heptane B. P. 182–183° C. at 3 mm., $n_D^{20}$ 1.5095, $d_4^{20}$ 1.001, $MR_D$ 103, percent by weight silicon 16.6.

Example 3

When 1 mol of the disiloxane

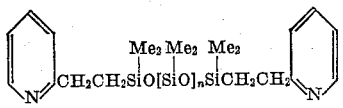

is copolymerized with two mols of octamethylcyclotetrasiloxane by heating a mixture of the two at a temperature of 80° C. in the presence of .2 g. KOH for two days and the resulting product is distilled, compounds of the formula

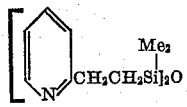

where $n$ is 1, 2, and 3 are obtained. The distillation residue is composed of higher boiling products of the above formula where $n$ has a value of 4 and above.

Example 4

Equivalent results are obtained when the disiloxane of Example 3 is copolymerized with phenylmethylsiloxane or methylvinylsiloxane or dichlorophenylmethylsiloxane in the manner of Example 3.

That which is claimed is:

1. Compounds of the formula

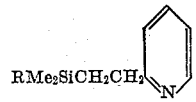

where R is selected from the group consisting of phenyl and methyl radicals.

2. A compound of the formula

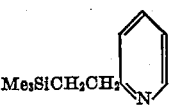

3. The method which comprises reacting a silane of the formula

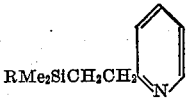

in which R is selected from the group consisting of phenyl and methyl radicals with concentrated sulphuric acid whereby the R group is cleaved from the silicon and thereafter reacting the product with water whereby a disiloxane of the formula

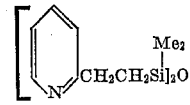

is obtained.

4. A compound of the formula

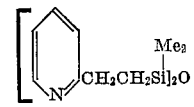

References Cited in the file of this patent

UNITED STATES PATENTS

| | | |
|---|---|---|
| 2,238,669 | Wiley | Apr. 15, 1941 |
| 2,444,784 | Meals | July 6, 1948 |
| 2,481,052 | Warrick | Sept. 6, 1949 |
| 2,500,110 | Allen et al. | Mar. 7, 1950 |
| 2,584,665 | Bluestein | Feb. 5, 1952 |
| 2,637,623 | Janes | May 5, 1953 |